US012162732B2

(12) United States Patent
Harmon et al.

(10) Patent No.: US 12,162,732 B2
(45) Date of Patent: Dec. 10, 2024

(54) LOAD MOMENT INDICATOR

(71) Applicant: Tulsa Winch, Inc., Jenks, OK (US)

(72) Inventors: Andrew Harmon, Tulsa, OK (US); Tony Jones, Bixby, OK (US)

(73) Assignee: Tulsa Winch, Inc., Jenks, OK (US)

( * ) Notice: Subject to any disclaimer, the term of this patent is extended or adjusted under 35 U.S.C. 154(b) by 166 days.

(21) Appl. No.: 16/812,068

(22) Filed: Mar. 6, 2020

(65) Prior Publication Data

US 2020/0354199 A1 Nov. 12, 2020

Related U.S. Application Data

(60) Provisional application No. 62/844,523, filed on May 7, 2019.

(51) Int. Cl.
*B66C 23/90* (2006.01)

(52) U.S. Cl.
CPC .................................. *B66C 23/905* (2013.01)

(58) Field of Classification Search
CPC .............................. B66C 23/90; B66C 23/905
See application file for complete search history.

(56) References Cited

U.S. PATENT DOCUMENTS 3,638,211 A 1/1972 Sanchez
5,711,440 A 1/1998 Wada
6,081,292 A 6/2000 Lanigan, Jr. et al.
6,378,653 B1 * 4/2002 Takahashi ............. B66F 11/046 182/62.5
8,738,175 B2 * 5/2014 Cameron ................ G01S 19/46 700/229
8,925,310 B2 * 1/2015 Pirri ...................... E02F 9/2296 60/426
2005/0189168 A1 9/2005 Bean et al.
2005/0224439 A1 10/2005 Bean et al.
2011/0187548 A1 * 8/2011 Maynard ............... B66C 15/045 340/685
2012/0099955 A1 4/2012 Glitza
2015/0314997 A1 * 11/2015 Petrak ..................... B66C 13/18 212/278

(Continued)

FOREIGN PATENT DOCUMENTS

EP 3015625 A1 5/2016
JP 2006044932 A * 2/2006 ............ B66C 23/90

(Continued)

OTHER PUBLICATIONS

Kamezaki et al., "Condition-Based Less-Error Data Selection for Robust and Accurate Mass Measurement in Large-Scale Hydraulic Manipulators", Jul. 2017, vol. 66, No. 7, Publisher: IEEE Transactions on Instrumentation and Measurement.

*Primary Examiner* — Sang K Kim
*Assistant Examiner* — Nathaniel L Adams
(74) *Attorney, Agent, or Firm* — GableGotwals; David G. Woodral

(57) ABSTRACT

A system for use on a load moving machine. A first sensor node having at least one sensor, a second sensor node having at least one sensor. The first and second sensor nodes are placed on first and second fixed locations with respect to the lifting machine such that the first and second sensor nodes utilize their respective sensors, to report current geometric data with respect to the load moving machine.

1 Claim, 6 Drawing Sheets

(56) References Cited

U.S. PATENT DOCUMENTS

| | | | | |
|---|---|---|---|---|
| 2016/0121481 A1* | 5/2016 | Borroni | B66C 13/46 700/256 | |
| 2016/0145081 A1 | 5/2016 | Petrax | | |

FOREIGN PATENT DOCUMENTS

| | | | | |
|---|---|---|---|---|
| WO | 2018087524 A1 | 5/2018 | | |
| WO | WO-2018160119 A1 * | 9/2018 | B66C 13/46 | |
| WO | PCT/US20/021553 | 5/2020 | | |

* cited by examiner

LOAD MOMENT INDICATOR

CROSS-REFERENCE TO RELATED CASES

This application claims the benefit of U.S. provisional patent application Ser. No. 62/844,523, filed on May 7, 2019, and incorporates such provisional application by reference into this disclosure as if fully set out at this point.

FIELD OF THE INVENTION

This disclosure relates to heavy machinery in general and, more specifically, to a load moment indication system suitable to a variety of applications.

BACKGROUND OF THE INVENTION

Operators of heavy equipment such as cranes, or other lifting or moving devices, must remain aware of the effect of a lifted load on the stability of the machine. For example, a lighter load may be safely lifted or moved on an extended boom, but a heavier load may cause an unsafe condition by tending to destabilize or overturn the machine.

What is needed is a system and method for addressing the above and related problems.

SUMMARY OF THE INVENTION

The invention of the present disclosure, in one aspect thereof, comprises a system for use on a lifting machine having at least a boom and a base. The system includes a first sensor node positioned in first fixed position on the boom, and a second sensor node positioned in a second fixed position on the base. The first and second sensor nodes provide a measurement of a distance between the two nodes, and the first and second sensor nodes provide a measurement of an angle between the boom and the base.

The system may further comprise a sensor hub that receives data from the first and second sensor nodes and reports the distance between the two nodes and the angle between the boom and the base. At least the first sensor node may comprise an elevation sensor and report its elevation to the base. The hub may also contain geometric information with respect to the lifting machine and report a radial distance from the first sensor node to a center of the lifting machine.

The first and second sensor nodes may each comprise at least two distance measurement sensors and report the distance between the sensor nodes based on a fusion of input from the at least two sensors. The boom may be a multi-segment boom and the system may include at least one sensor node per segment of the boom.

The invention of the present disclosure, in another aspect thereof, comprises a system for use on a load moving machine having a first sensor node having at least one sensor, a second sensor node having at least one sensor. The first and second sensor nodes are placed on first and second fixed locations with respect to the lifting machine such that the first and second sensor nodes utilize their respective sensors, to report current geometric data with respect to the load moving machine.

In some embodiments the first and second sensor nodes each have a plurality of sensors that gather current geometric data with respect to the load moving machine. They may each comprise a microprocessor performing sensor fusion on data from the respective plurality of sensors and report the sensor fused data as the current geometric data. The current geometric data includes a boom length of the load moving machine, a boom angle of the load moving machine, and/or a radial extension of a boom from a fixed point on the load moving machine.

The system may include a sensor hub that receives the current geometric data with respect to the load moving machine from the first and second nodes. The sensor hub may perform sensor fusion on the data received from the first and second nodes and provide the fused data as the current geometric data. In some cases, the sensor hub provides the current geometric data to a load moment indicator system associated with the load moving machine. In other cases, the sensor hub comprises a load moment indicator system associated with the load moving machine.

The invention of the present disclosure, in another aspect thereof, comprises a system for reporting boom position information of a crane. The system includes first and second sensor nodes that provide positional information with respect to their own location. The first sensor node is rigidly affixed to the boom, and the second sensor node is rigidly affixed to a central location of the crane that is not on the boom.

The system may include a sensor hub that reports the boom position information from the first and second sensor nodes to a load moment indicator system associated with the crane. The boom position information may include boom angle relative to level and/or maximum distance of the boom from a center of the crane.

DETAILED DESCRIPTION OF THE PREFERRED EMBODIMENTS

Figure 1:
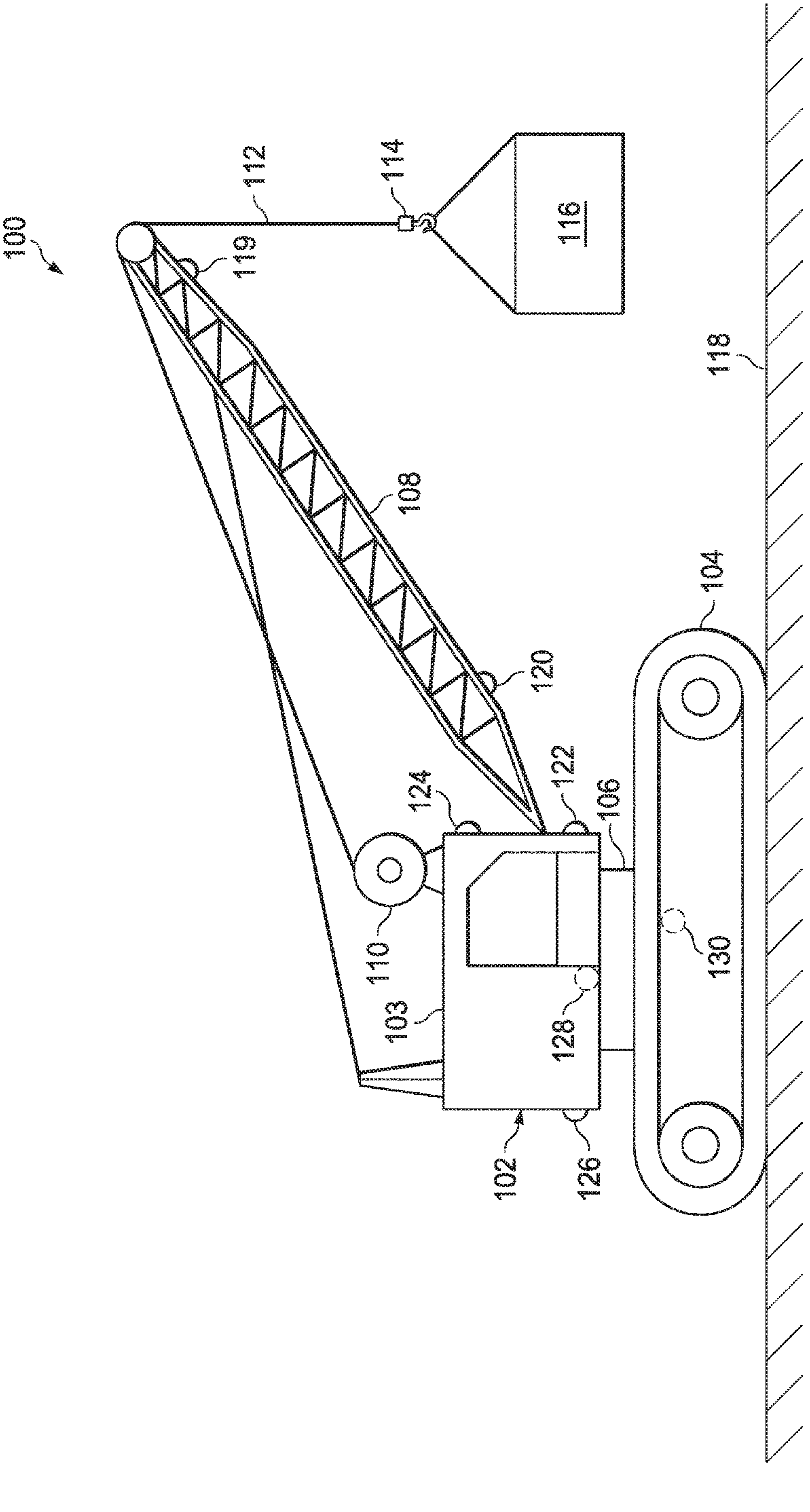
FIG. 1 is a side view of a crane with a load moment indicator according to aspects of the present disclosure.

FIG. 1 is a perspective view of a boom crane 100. This represents one type of crane, as is known in the art, with which embodiments of the present disclosure may operate. Other types of cranes or lifting devices may also be used with systems and methods of the present disclosure. These would include, but are not limited to, lattice work cranes, tower cranes, loader cranes, truck mounted cranes and others. Embodiments of the present disclosure may be retrofitted to operate on existing cranes or may be integrated with a crane at the time of manufacture.

The crane 100 comprises an upper portion 102, which may provide a cab 103 and other working components, affixed in a rotational or articulating fashion to a base 104. The base 104 may provide locomotion and gross positioning for lifting, moving, and other work performed by the crane 100. The upper portion 102 may be fixed to the base 104 by a rotational drive mechanism 106. The rotational drive mechanism 106 may also be known as a rotex gear. The rotational drive mechanism 106 may comprise a slew ring and associated powered drive gears and controllers.

The upper portion 102 provides a boom 108 from which loads may be lifted and moved. A single-piece boom 108 is shown but it should be understood that multi-piece booms with jibs and other subcomponents may be utilized. A hoist mechanism 110 or winch spools and unspools winch line 112 for lifting and lowering loads using a load hook 114. The winch line 112 may comprise a woven steel cable or other winch line as is known in the art. The load hook 114 may or may not comprise an actual hook. The load hook 114 serves as a location for securement and release of an associated load 116. Here, the load 116 is shown as a simple box but other loads of varying types are contemplated herein.

In addition to lifting and lowering, the crane 100 also rotates the boom 108 as a component of the upper portion in relation to the base 104. Thus, loads may be lifted and moved based on manipulation or rotation of the rotational drive mechanism 106 and the hoist 110. The base 104 may remain stationary with respect to a work surface 118 when loads are being manipulated. The work surface 118 may be a piece of ground or concrete at a work site, for example. The crane 100 may include various outriggers, counter-weights, and additional components as are known in the art.

A load moment indicator ("LMI") comprises a system to aid an equipment operator by sensing (directly or indirectly) and/or calculating based on various sensors, the overturning or load moment experienced by a piece of operating equipment (e.g., such as the crane 100). In one aspect, the load moment may be considered the load multiplied by the radius or distance of the load weight from the center or center of mass of the crane. Every safely operational lifting machine will have a rated capacity with respect to load moment. An LMI system compares lifting conditions to rated capacity may indicates to the operator a percentage of capacity at which the equipment is working. Lights, bells, or buzzers may be incorporated as a warning of an approaching overload condition.

Fixed or variable data regarding the crane or other machine maybe stored in a control computer or LMI computer memory. This may include as information such as dimensional data, capacity charts, boom weights, and centers of gravity. Such data may comprise the reference information used to calculate the operating conditions.

According to the present disclosure, boom length, boom angle, boom elevation and other parameters are measured or calculated based upon data from sensor nodes at various locations on or around the crane 100. Data such as length, position, angle, elevation, rotation and other data, whether measured directly or computed, and relating to the position of a part in space, or with respect to other parts of a lifting machine, or other machine having predefined ranges of relationship between its parts, may be defined as "geometric data". As the relationship between various parts can change over time (e.g., by movement of a load, boom, etc.) the present position or relationship data may be defined as "current geometric data."

Figure 4:
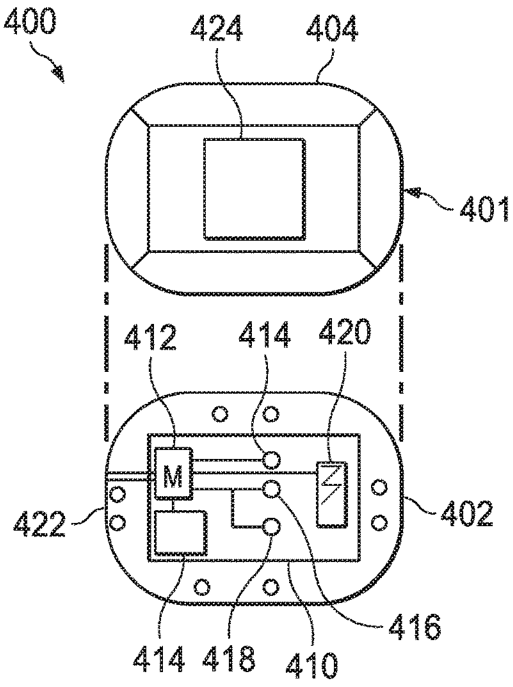
FIG. 4 is an exemplary schematic diagram of a node of load moment indicator according to aspects of the present disclosure.

As described further below, various sensor nodes of the present disclosure that may be used to gather or calculate such geometric data may include a plurality of LMI node sensors 400 (FIG. 4). Sensor locations may include locations 118 (ground level), 120 (at or near base of boom 108), 122 (lower portion of cab 102 and/or boom connection point), 124 (top of cab 102 and/or hoist location), 126 (lower, rear of cab 102), 128 (approximate central axis of rotation of the cab 102), 130 (approximate center of mass of unloaded crane 100) or other locations. Additional locations include, but are not limited to a winch or reel, load hook, jib attachments, tracks, chassis, and outriggers. A hydraulic pressure sensor or other device may also provide information with respect to the weight of the load being lifted. In some instances, control computers may be programmed or configured to prevent the operator from moving a load such as to create an unsafe operating condition.

Figure 2:
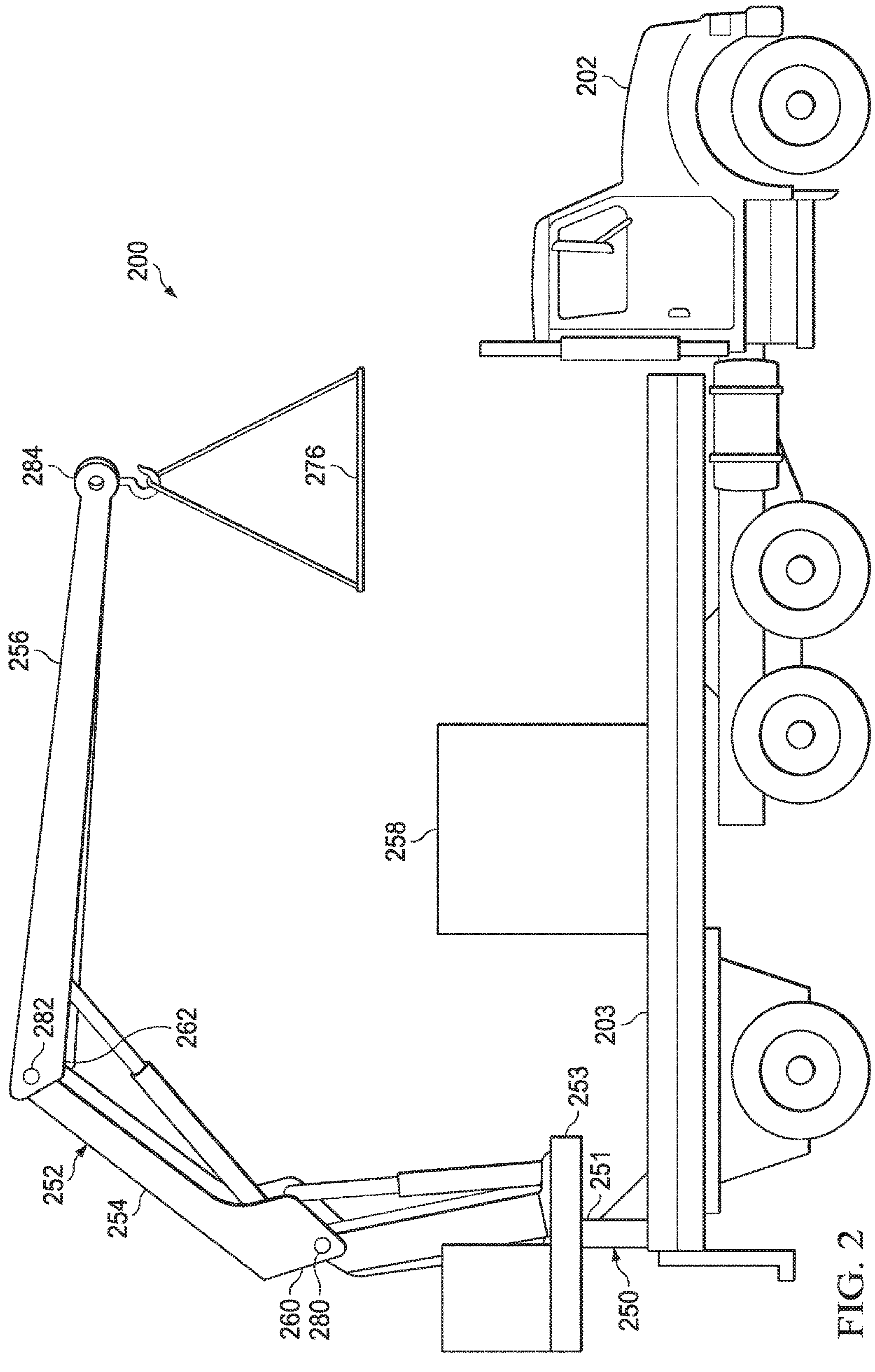
FIG. 2 is a side view of a cargo truck with articulating crane according to aspects of the present disclosure.

Referring now to FIG. 2, a side view of a cargo truck 200 with articulating crane 250 according to aspects of the present disclosure is shown. Here a truck 200 may include a cab 202 and a cargo bed 203 or the like. The crane 250 may be mounted onto the bed 203, possibly on a stanchion 251 or other support structure. Exact structures of articulating cranes may vary but, as shown, the crane 250 comprises a boom 252 having a plurality of articulating segments 254, 256. The boom 252 may join to a rotatable platform 253 via a joint 260. A joint 262 may connect segments 254, 256. Articulation between the segments 254, 256 and/or the platform 253 may be based on hydraulics and/or electric motors or actuators. In operation, rotation of the platform 253 and movement of the segments 254, 256 about the joints 260, 262 allows loads (e.g., load 258) to be lifted onto or off of the bed 203 from the ground or another surface. An exemplary load platform 276 is shown suspended from a distal end of segment 256, but other attachment devices may be utilized (such as, but not limited to, hooks, clamps, etc.).

As with the crane 100, the crane 200 provides locations at which sensors (e.g., LMI sensor nodes 400, described below) may be placed to measure distances, elevations, angles, etc. for use in LMI calculations. Here sensor location is illustrated at a center of the rotation platform 280 (this also may be where the segment 254 joins the platform 253), a central join location 282, a location 284 on or near a distal end of the far segment 256, and/or a multitude of other locations. Again, additional sensor locations might include the load 258, the ground surface, the load platform 276, multiple locations on the truck (e.g., center of mass), on outriggers, or other important locations.

Figure 3:
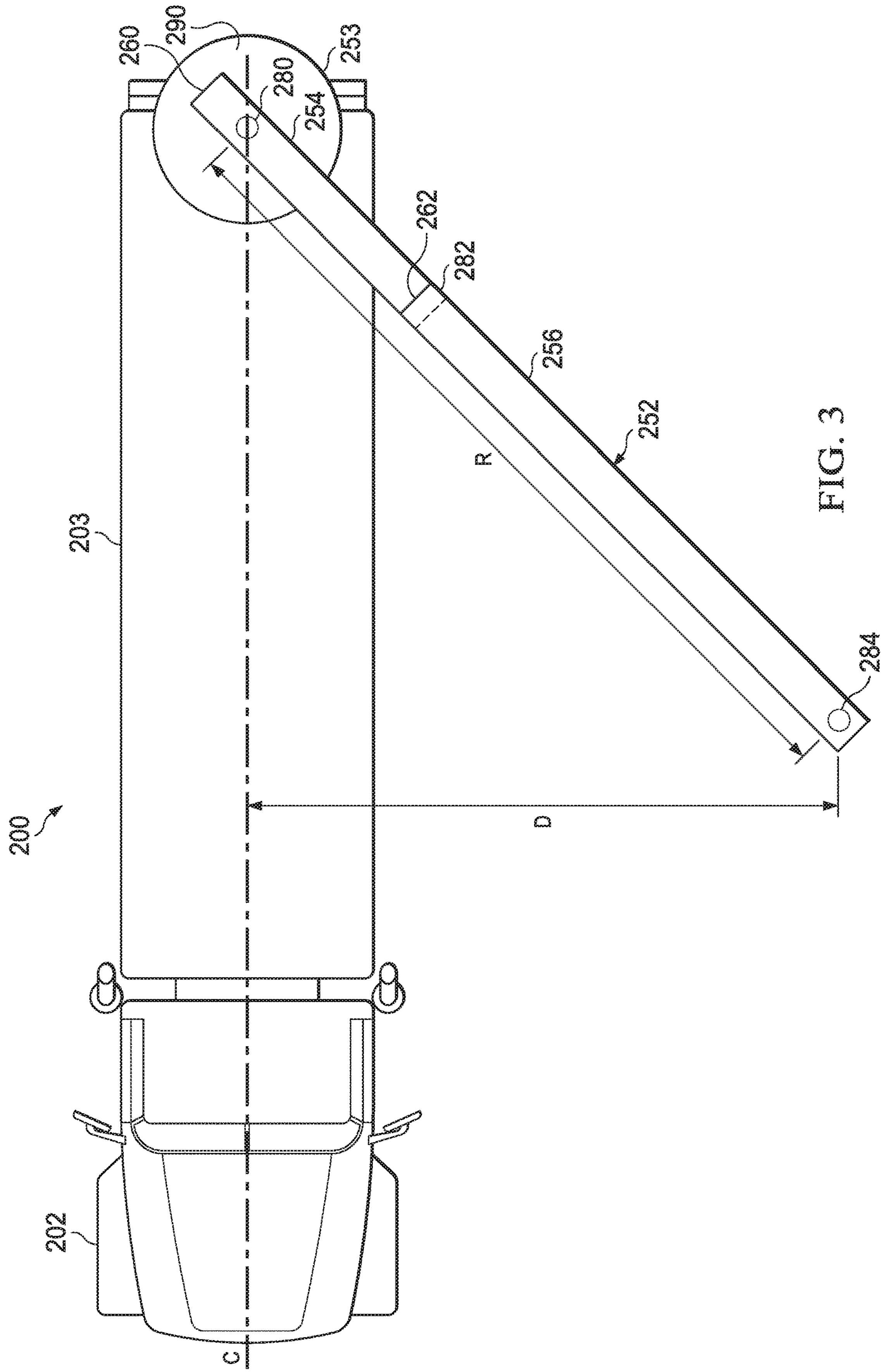
FIG. 3 is an overhead view of the cargo truck of FIG. 2.

Referring now to FIG. 3, an overhead view of the cargo truck 200 of FIG. 2 is shown. Here, a centerline C of the truck 200 is shown. Load moments may be calculated based off of this line, as shown by distance D, or from a center 290 of rotation of the platform 253 as shown by distance R. In either case, and as with any crane or lifting device there is a maximum distance at which a load of a given weight can be lifted without danger of overturn. As is known in the art, wind, terrain, and other factors may be taken into account as well. It can be critical to accurately gauge the distance from the crane or its center to the load.

It should also be appreciated, from the overhead view of FIG. 3, that the distance between sensor locations 284 and 280 corresponds to the distance R. It is also a simple geometric calculation to determine this distance if the angle of the segments 254, 256 can be measured, and their lengths are known (which they would be on any commercial crane). Similarly, given the distance R, computed or measured, if an angle of rotation of the platform 253 can be calculated or measured, the distance D can be computed as well.

It should be appreciated that similar calculations with respect to load distance can be made based on the sensor locations of FIG. 1. Here if boom 108 length and its angle are known, distance of the load 116 from, for example, the cab at location 122 can be calculated. A distance between sensors locations 122 and 128 can also be used to calculate distance of the load 116 from center of the cab 128. It should also be appreciated that where absolute elevation of, for example, sensors locations 128 and 119 can be determined along with the distance between these sensors, simple trigonometric or geometric calculations enable determination of the distance portion of a load moment calculation (the rest comprising the weight of the load 116). The present disclosure provides systems and methods of sensor nodes and network that enable these kinds of measurements and calculations, and more.

Referring now to FIG. 4 is an exploded diagram of a node 400 of load moment indicator system according to aspects of the present disclosure is shown. The LMI node, or simply "node" 400 of the present disclosure comprises a rugged and robust device capable of installation and operation from any of the various locations previous discussed, and possibly others. In some embodiments, a rugged weatherproof and or waterproof body 401 protects internal components. The body 401 may comprise a metal alloy, a polymer, and elastomer, and/or other materials. The body 401 may comprise a base 402 and cover 403. The base 402 and cover 403 may removably affixed to one another or may be intended to be permanently joined when the node 400 is assembled (e.g., no internal user service ability). Various gaskets, seals, adhesives, fasteners or other implements may be used to join the base 402 and the cover 404. The base 402 or other portion of the body 401 may include various mounting flanges, fasteners, openings, threaded openings or the like to enable the node 400 to be fixed at a chosen location.

Internally, the node 400 may comprise a circuit board 410, or possibly multiple circuit boards joined by buses or other communication pathways if needed. A microcontroller 412 may provide local computing resources for the node 400. The microcontroller 412 may comprise a system-on-a-chip device such that I/O functions, measurement, A/D and D/A conversion, communication, memory and other functions occur on a single chip. The microcontroller 412 may comprise a general purpose or commercially available processor or an application specific integrated circuit (ASIC). In other embodiments, it should be understood that functions of the microcontroller 412 may be split among multiple components. For example, a general-purpose microcontroller may be fitted with stand-alone communication protocol chips, A/D, D/A and other device that, taken together, perform the necessary functions and operations as needed by a microcontroller 412. For simplicity, power leads, pull-up resistors, safety capacitors, and other analog signal conditioning and amplification circuity is not shown.

One or more sensor 414, 416, 418 may be included for use by or for the node 400. These may feed directly into the microcontroller 412 or may have signal conditioning circuit included. They may also have their own control chips and or routines. Without limitation, the sensors 414, 416, 418 may include accelerometers, rate gyroscopes, magnetometers, barometric pressure sensors, humidity sensors, radio frequency, global positioning system (GPS), RF time of flight or time of arrival (e.g., time difference of arrival, two way ranging), angle (e.g., phased array angle sensing), ultrasonic distance sensors, LIDAR, and vision based ranging such as stereo cameras. Three sensors 414, 416, 418 are shown for illustrative purposes but it should be understood that more or fewer sensors may be present within a node 400. It is also note necessary that every node 400 comprise the same sensor suite. Some sensors are capable of operating entirely enclosed within the cover 401. These would include, for example, angle and gyroscopic sensors. Other sensors may require at least some degree of exposure to the ambient environment. These may include, for example, altitude and pressure sensors, optical sensors, and certain sensors relying on transmission or reception of RF data. In such case, a sensor or sensor probe may be positioned on or within the cover 401 such that such access is provided. It will be appreciated that the cover 401 can be readily adapted to accommodate the sensors within by one of skill in the art.

The node 400 may be powered by an internal power supply 414 or battery. The power supply may be rechargeable by a solar panel 424, for example, by access to on-board vehicle voltage, by inductive means, by known parasitic power access methods, or any other known method. The node 422 may also have an external port 422 that can be used for charging, for data transfer, for programming, and/or other functions. An antenna 420 may be provided internally, as a component of the microprocessor 412 or other component, or externally or within the cover 401.

Figure 5:
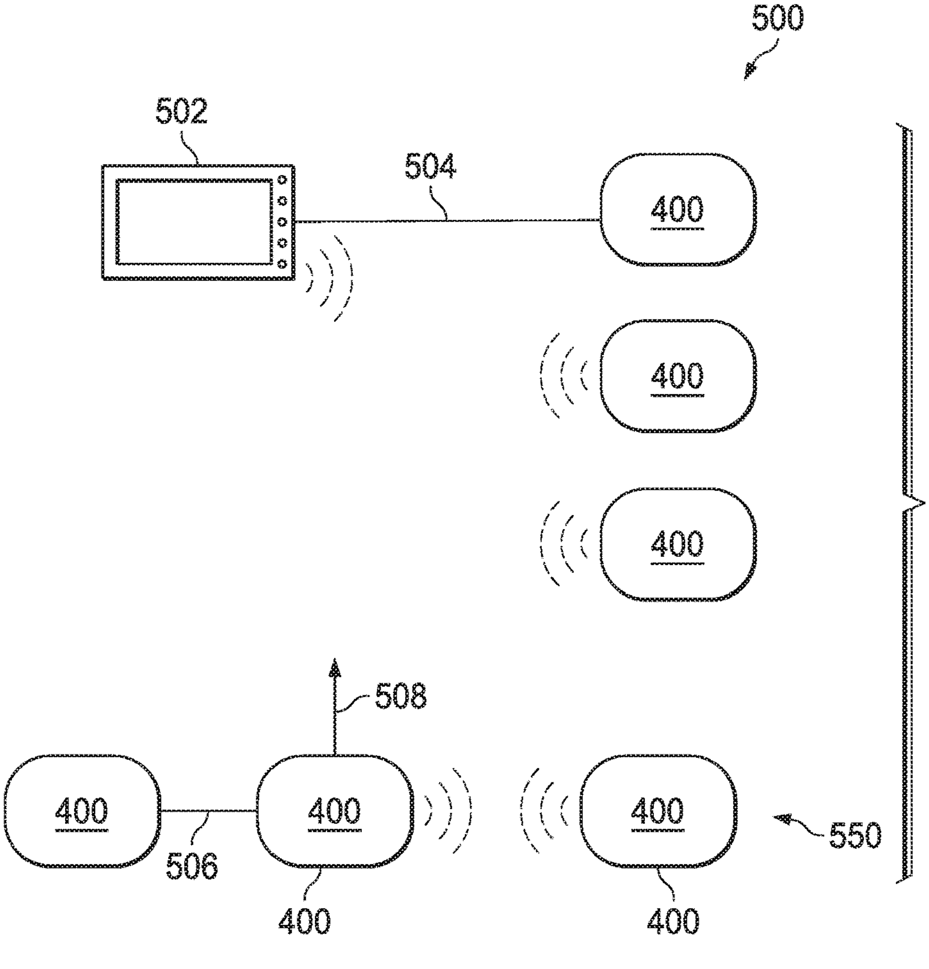
FIG. 5 is a schematic diagram of exemplary topological relationships amongst nodes a load moment indicating system according to aspects of the present disclosure.

Referring now to FIG. 5 a schematic diagram of exemplary topological relationships amongst nodes 400 a load moment indicating system 500 according to aspects of the present disclosure is shown. It should be understood that the physical location of the nodes 400 may correspond to the various location on the example cranes (e.g., 100, 250) previously described, or that other physical locations or configurations may be employed. FIG. 5 illustrates possible network topology of the nodes 400. As shown at 500, the nodes 400 may be configured to communicate with a hub 502 via wireline 504 and/or wireless protocols. Wireless protocols may include, but are not limited to, Wi-Fi and Bluetooth®. The number of nodes shown in FIG. 5 is for illustrative purposes only, as there may be more or fewer in any given LMI calculation network.

In one topology, the nodes 400 report to communicate their data to the hub 502. the hub 502 may comprise an LMI computer as is known in the art, or may comprise a hub specifically configured for use with the nodes 400 of the present disclosure. As discussed further below, individual sensor data may be acquired at the nodes 400, although some data may be provided by the hub 502 to further aid the nodes 400 in optimal fusion of data. This data is combined in a sensor fusion algorithm (e.g., by the hub 502 or the nodes 400 themselves) to ultimately resolve local node position. This is communicated back to the hub 502 (if not computed there) and finally to an LMI device or display for use by an operator and/or crane control computer. Thus, it may be appreciated that the hub 502 may itself comprise various computing capacities. The hub 502 may be based on general purpose computer or purpose-built device capable of interacting with the nodes 400 and performing the necessary calculations. One of skill in the art will appreciate the wide variety of ways that the hub 502 may be configured to operate. In some embodiments, the hub 502 provides a display and other I/O implements to enable a user or operator to view data on the hub 502, perform testing, programming and possibly other operations.

In addition to operating with respect to a hub, in some embodiments, the nodes 400 are capable of operating, taking measurements, making calculations, etc., in a hubless arrangement as shown at 550. This type of arrangement may be considered peer-to-peer or ad hoc in operation. Nodes 400 may communicate wirelessly to one another or with a wireline 506. One or more of the nodes 400 in such an arrangement may be able to forward measurements, calculations, or other parameters onward to an LMI computer, display, network, or other device as shown at 508. The communication link 508 may be one-way or two-way and may be a wireless or wireline protocol. It will be appreciated that in order to make certain calculations (e.g., distance or boom angle) it may be necessary that one or more nodes 400 receive data from one or more of the other nodes 400 on the network 550. The receiving node 400 may then implement any needed calculations (for example, those discussed above) using the microcontroller 412, for example.

Figure 6:
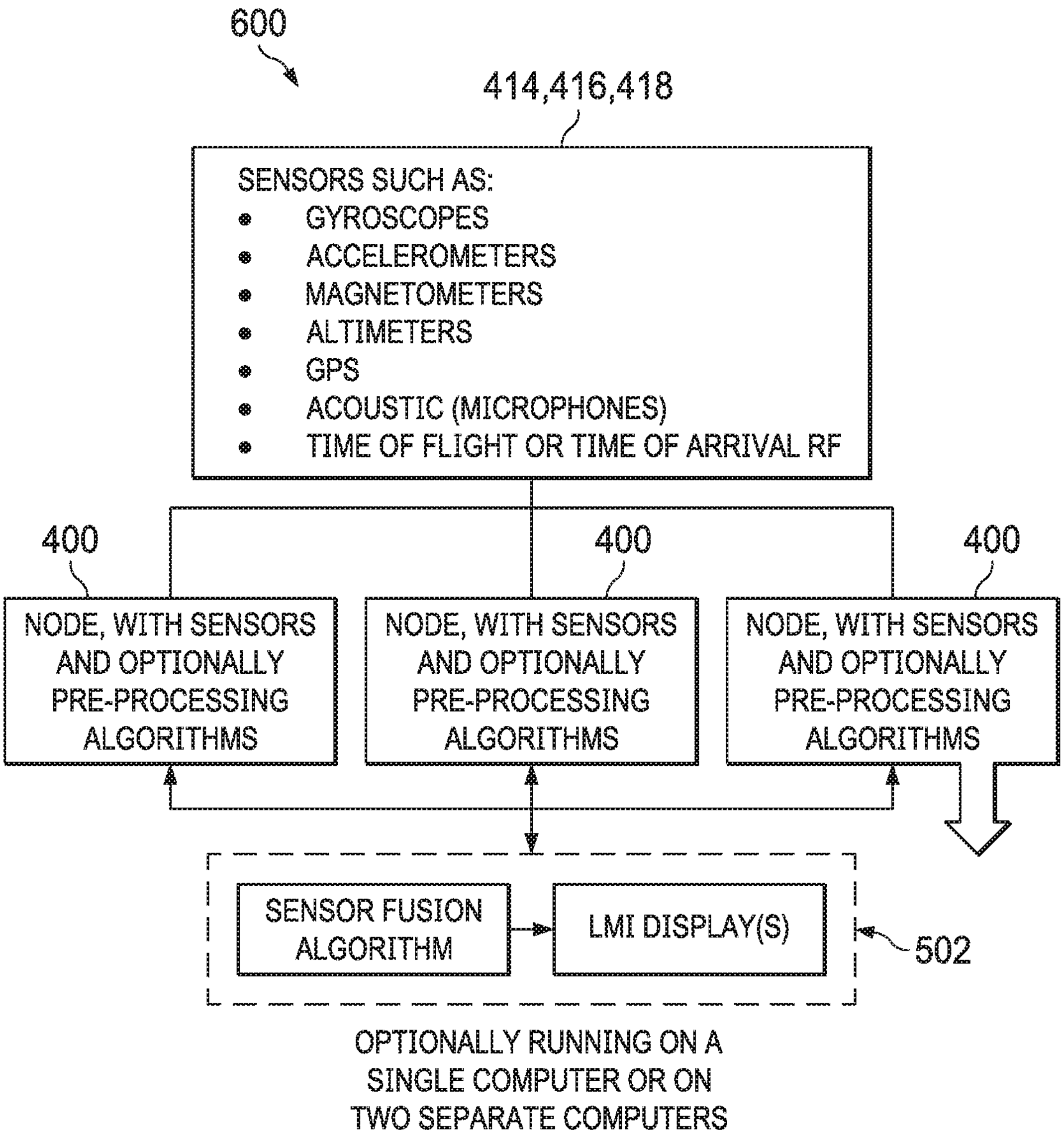
FIG. 6 is a flow chart depicting operational flow of a load moment indicator according to aspects of the present disclosure.

Referring now to FIG. 6, a flow chart depicting operational flow of a load moment indicator according to aspects of the present disclosure is shown. A plurality of separate sensors (e.g., 414, 416, 418, or others) may be arranged in discrete packages or nodes 400. As discussed, multiple sensors 414, 416, 418 may be combined in the same physical discrete package or node 400. Multiple sensor nodes 400 obtaining data pertaining the plurality of sensor locations may be used by an LMI display, computer, or control mechanism 502. Sensor fusion algorithms may be deployed to provide for useful data from the plurality of sensor nodes 400 or locations.

It should be appreciated that systems according to the present disclosure can infer or calculate positions of a variable geometry structure such as a crane 100, 250. The sensor nodes 400 may be distributed or affixed at key positions on the relevant structure or machine. Physical measurements relating to angle, position, relative position (e.g., sensor to sensor) and other information may thus be obtained for various the locations. Although the geometry of the structure that is measured may be variable, it may also be known that it falls within certain parameters. For example, in the crane of FIG. 2, the distance between locations 280 and 282 remains fixed. The distance between locations 280 and 282 also remains fixed. These known distances may not need to be measured but can be used to calculate other data points. Similarly, the position of various locations with respect to the ground (e.g., elevation) may be known for any upright and operational crane or other device. This information can be used to calculate other parameters, possibly using additional measurements from sensor nodes 400. It should be appreciated that when angle measurements are spoken of, these may be angles with respect to a level surface (e.g., ground surface 118), a normal angle (upright), between two components (e.g., segments 254,256) and/or other angles.

Measurements may also be taken with respect to locations that are not affixed to a machine (e.g., crane 100, 250). For example, if a node 400 is affixed to a load (or to a load hook such as 116), it may be possible to determine when an off-center or side lift is about to occur (e.g., due to wind). Thus, the boom 100 may be positioned directly over the load 116 before lifting, which can prevent load shifting. Similarly, given that some relationships between nodes 400 should always fall within specific parameters, if measurements are obtained that are beyond the parameters, it may be an indication of a fault in the LMI nodes 400, the hub 502, or in the crane or other machine itself. For example, the angle between segments 254, 256 of the boom 252 may indicate a broken or fatigued component such that the crane 250 or truck 200 needs repair or service.

Figure 7:
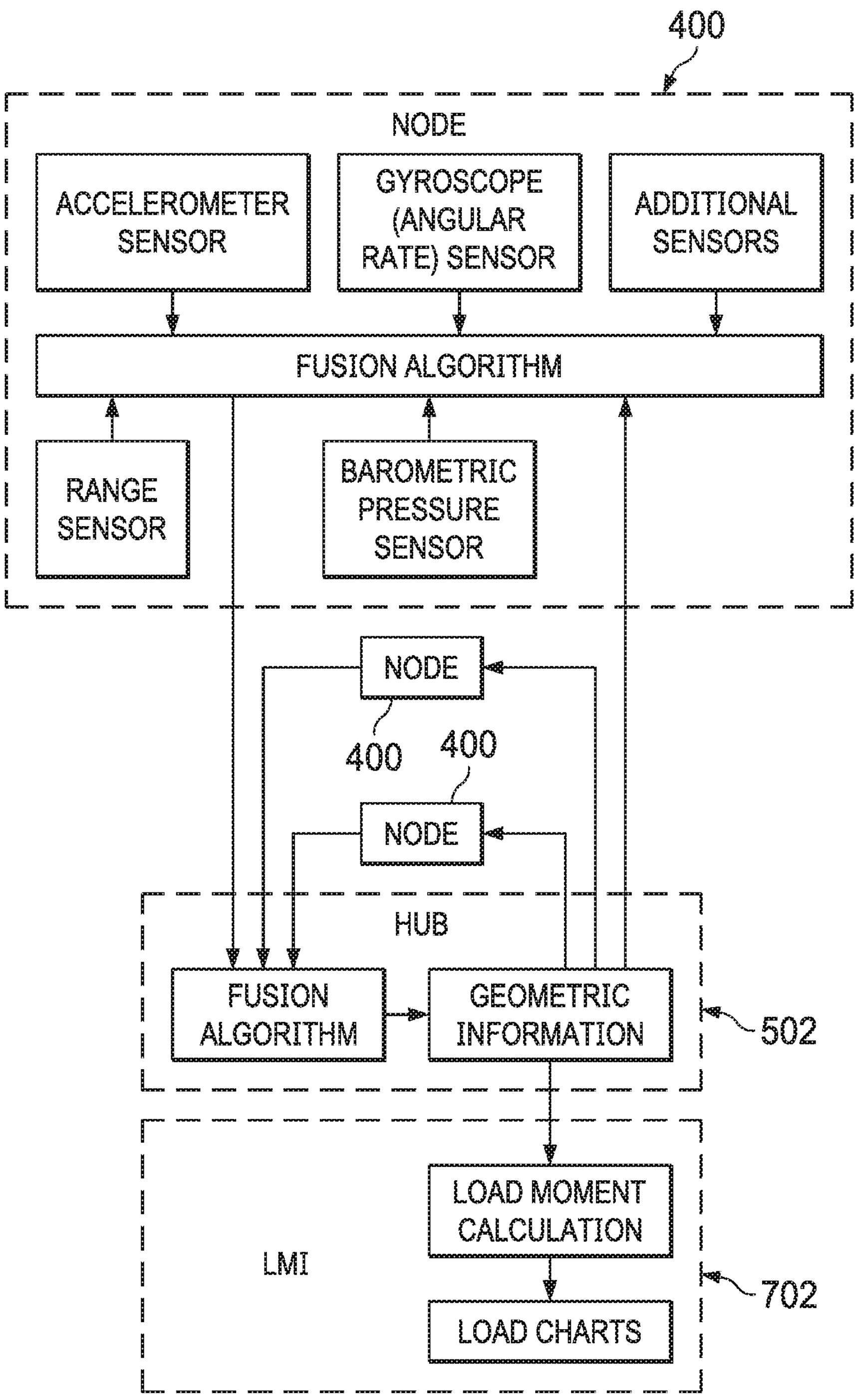
FIG. 7 is a relational diagram illustrating sensing and computational operations of various components of a load moment indicator according to aspects of the present disclosure.

Referring now to FIG. 7 a relational diagram 700 illustrating sensing and computational operations of various components of a load moment indicator according to aspects of the present disclosure is shown. FIG. 7 illustrates a number of nodes 400, each of which may be capable of collating and fusing data from multiple sensors to establish information with respect to position, angle, etc. This may occur on the microprocessor 412. Data may be transmitted to the hub 502, which may also perform fusion algorithms.

Geometric information may be transmitted to the nodes 400 in combination with fusion data back to the nodes 400 as needed. Finally, the final geometric information with respect to load moments may be transmitted to an LMI system 702 for calculation and/or comparison against load charts (electronic or digital) to ensure the crane or other machine is not operated outside of safe parameters.

Various fusion algorithms may be used to establish final positions for sensors/locations, especially where readings are not entirely stable, or where there is conflict between readings or calculations based on those readings. Without limitation, such methods and algorithms include Kalman, extended Kalman, unscented Kalman (a type established sensor fusion algorithm, the internal coefficients and parameters are unique to each filter), and complementary filter. Relationships between sensor readings (such as gyro and accelerometer readings) can be used to smooth angle sensing and to calculate radius (for example) by the ratio of their readings. These relationships may be coded into the matrices of a Kalman filter, for example. The geometric constraints of the physical platform (in this case a crane) provides an extra degree of precision.

For non-directly measured parameters, redundant sensors may be used to better calculate the true value of the parameter. Additional nodes 400 can be placed on attachments (or even placed on the load or hand carried) to aid in correct configuration detection or localization. Additional parameters can be measured indirectly, such as parts of line (number of loops of the lifting rope through the hook pulley block), outrigger location, load position in relation to the boom tip or hook etc., but various nodes 400 of the present disclosure, or other known sensor types.

Sensor fusion may enable information to be assembled, collated, or otherwise used to determine attributes across the entire machine, or related to only relevant portions of the machine (e.g., cranes 100, 250 or other machines). Positions may be reported to control and/or LMI computers. In some specific embodiments, boom angle and position information may be utilized by the LMI and compared against stored or computed values relating to safe lift or movement of loads. This information may be used by control computers or provided as data to an operator. Unsafe load conditions may provide audible, visual, or tactile warnings to the operator. In some embodiments, control computers will prevent or halt unsafe movements based on the LMI systems and methods herein described.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A system for use on a lifting machine having at least a boom lifting a load and a base supporting the boom and experiencing a moment as a result of the lifted load, the system comprising:

a first sensor node positioned in first fixed position on the boom; and a second sensor node positioned in a second fixed position on the base;

a sensor hub that receives data from the first and second sensor nodes;

wherein the first and second sensor nodes each provide data to the sensor hub that includes positional information with respect to the first and second sensor nodes, respectively; and wherein the first and second sensor nodes provide a measurement of an upright angle between the boom and the base to the sensor hub; and wherein the sensor hub reports the distance between the two nodes and the angle between the boom and the base to a load moment computer for use in calculating the moment experienced by the base;

wherein at least the first sensor node comprises an elevation sensor;

wherein the hub contains geometric information with respect to the lifting machine and reports a radial distance from the first sensor node to a center of the lifting machine; and wherein the first and second sensor nodes each comprise at least two distance measurement sensors and report the distance between the sensor nodes based on a fusion of input from the at least two sensors.

* * * * *